United States Patent
Yang et al.

(10) Patent No.: US 11,250,243 B2
(45) Date of Patent: Feb. 15, 2022

(54) PERSON SEARCH SYSTEM BASED ON MULTIPLE DEEP LEARNING MODELS

(71) Applicant: NEC Laboratories America, Inc., Princeton, NJ (US)

(72) Inventors: Yi Yang, Princeton, NJ (US); Giuseppe Coviello, Princeton, NJ (US); Biplob Debnath, Princeton, NJ (US); Srimat Chakradhar, Manalapan, NJ (US)

(73) Assignee: NEC Corporation

( * ) Notice: Subject to any disclaimer, the term of this patent is extended or adjusted under 35 U.S.C. 154(b) by 80 days.

(21) Appl. No.: 16/808,983

(22) Filed: Mar. 4, 2020

(65) Prior Publication Data

US 2020/0311387 A1     Oct. 1, 2020

Related U.S. Application Data

(60) Provisional application No. 62/823,950, filed on Mar. 26, 2019.

(51) Int. Cl.
  *G06K 9/00*     (2006.01)
  *G06F 16/9038*     (2019.01)

(52) U.S. Cl.
  CPC ..... *G06K 9/00288* (2013.01); *G06F 16/9038* (2019.01); *G06K 9/00255* (2013.01);
  (Continued)

(58) Field of Classification Search
  CPC .......... G06K 9/00335; G06K 9/00221; G06K 9/00288; G06K 9/00362; G06K 9/00624;
  (Continued)

(56) References Cited

U.S. PATENT DOCUMENTS

2006/0251338 A1* 11/2006 Gokturk ............... G06F 16/583
  382/305
2011/0274314 A1* 11/2011 Yang ...................... G06T 7/187
  382/103

(Continued)

OTHER PUBLICATIONS

Ahmed et al., "An Improved Deep Learning Architecture for Person Re-Identification", 2015 Proceedings of the IEEE Conference on Computer Vision and Pattern Recognition. Jun. 7-12, 2015. (pp. 3908-3916.).

(Continued)

*Primary Examiner* — Nizar N Sivji
(74) *Attorney, Agent, or Firm* — Joseph Kolodka (57) ABSTRACT

A computer-implemented method executed by at least one processor for person identification is presented. The method includes employing one or more cameras to receive a video stream including a plurality of frames to extract features therefrom, detecting, via an object detection model, objects within the plurality of frames, detecting, via a key point detection model, persons within the plurality of frames, detecting, via a color detection model, color of clothing worn by the persons, detecting, via a gender and age detection model, an age and a gender of the persons, establishing a spatial connection between the objects and the persons, storing the features in a feature database, each feature associated with a confidence value, and normalizing, via a ranking component, the confidence values of each of the features.

17 Claims, 8 Drawing Sheets

(52) U.S. Cl.
CPC .................... G06K 9/00275 (2013.01); *G06K 2009/00322* (2013.01)

(58) Field of Classification Search
CPC ........... G06K 9/00671; G06K 9/00255; G06K 9/00275; G06K 2009/00322; G06K 2209/27; G06K 9/00248; G06K 9/00771; G06K 9/6273; G06F 16/9038
See application file for complete search history.

(56) References Cited

U.S. PATENT DOCUMENTS

| | | | |
|---|---|---|---|
| 2012/0007975 A1* | 1/2012 | Lyons | G06K 9/00771 348/77 |
| 2013/0201330 A1* | 8/2013 | Thornton | H04N 7/18 348/143 |
| 2015/0332087 A1* | 11/2015 | Joshi | G06K 9/00 382/203 |
| 2016/0239712 A1* | 8/2016 | Kitano | G06K 9/00187 |
| 2017/0046561 A1* | 2/2017 | Ptucha | G06F 16/5838 |
| 2017/0098122 A1* | 4/2017 | el Kaliouby | G16H 50/30 |
| 2018/0181836 A1* | 6/2018 | Xie | G06K 9/00771 |
| 2018/0253597 A1* | 9/2018 | Kozakaya | G08B 13/196 |
| 2019/0034735 A1* | 1/2019 | Cuban | G06K 9/00369 |
| 2020/0004291 A1* | 1/2020 | Wexler | G10L 15/10 |
| 2020/0089703 A1* | 3/2020 | Yamaji | G06K 9/72 |
| 2021/0081821 A1* | 3/2021 | Sasaki | G10L 25/27 |

OTHER PUBLICATIONS

Prosser et al., "Person Re-Identification by Support Vector Ranking", The British Machine Vision Conference. vol. 2, No. 5. Aug. 30-Sep. 2, 2010. (pp. 1-11.).

* cited by examiner

PERSON SEARCH SYSTEM BASED ON MULTIPLE DEEP LEARNING MODELS

RELATED APPLICATION INFORMATION

This application claims priority to Provisional Application No. 62/823,950, filed on Mar. 26, 2019, incorporated herein by reference in its entirety.

BACKGROUND

Technical Field

The present invention relates to neural networks and, more particularly, to employing deep learning detection models to identify individuals by multiple features.

Description of the Related Art

Recently there has been a tremendous increase in the accuracy of object detection by employing deep convolutional neural networks (CNNs). This has made visual object detection an attractive possibility for domains ranging from surveillance to autonomous driving. However, speed is a key requirement in many applications, which fundamentally contends with demands on accuracy. Thus, while advances in object detection have relied on increasingly deeper architectures, such architectures are associated with an increase in computational expense at runtime.

SUMMARY

A computer-implemented method executed by at least one processor for person identification is presented. The method includes employing one or more cameras to receive a video stream including a plurality of frames to extract features therefrom, detecting, via an object detection model, objects within the plurality of frames, detecting, via a key point detection model, persons within the plurality of frames, detecting, via a color detection model, color of clothing worn by the persons, detecting, via a gender and age detection model, an age and a gender of the persons, establishing a spatial connection between the objects and the persons, storing the features in a feature database, each feature associated with a confidence value, and normalizing, via a ranking component, the confidence values of each of the features.

A system for person identification is also presented. The system includes a memory and a processor in communication with the memory, wherein the processor is configured to employ one or more cameras to receive a video stream including a plurality of frames to extract features therefrom, detect, via an object detection model, objects within the plurality of frames, detect, via a key point detection model, persons within the plurality of frames, detect, via a color detection model, color of clothing worn by the persons, detect, via a gender and age detection model, an age and a gender of the persons, establish a spatial connection between the objects and the persons, store the features in a feature database, each feature associated with a confidence value, and normalize, via a ranking component, the confidence values of each of the features.

A non-transitory computer-readable storage medium comprising a computer-readable program is presented for person identification, wherein the computer-readable program when executed on a computer causes the computer to perform the steps of employing one or more cameras to receive a video stream including a plurality of frames to extract features therefrom, detecting, via an object detection model, objects within the plurality of frames, detecting, via a key point detection model, persons within the plurality of frames, detecting, via a color detection model, color of clothing worn by the persons, detecting, via a gender and age detection model, an age and a gender of the persons, establishing a spatial connection between the objects and the persons, storing the features in a feature database, each feature associated with a confidence value, and normalizing, via a ranking component, the confidence values of each of the features.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In the exemplary embodiments of the present invention, methods and devices for implementing deep neural networks are introduced. Deep neural networks have recently exhibited state-of-the-art performance in computer vision tasks such as image classification and object detection.

In the exemplary embodiments of the present invention, a system for searching for people in video streams through multiple features is introduced. The exemplary system has two components, a detection component that extracts features from videos, and a ranking component that sorts results after features matching. It is noted that deep learning models are applied only to object detection and classification, not to people matching. People matching occurs manually by one or more users, such as law enforcement personnel. As a result, the exemplary embodiments of the present invention do not need high quality facial images since other peripheral or auxiliary or supplemental features, other than facial features, can be employed to find a match. The search can be voice-activated or text-activated. Additionally, the exemplary embodiments normalize the confidence values from deep learning engines with the benefit of high accuracy of deep learning engines.

Moreover, the exemplary embodiments of the present invention can be applied to different real-world practical applications. In one instance, such deep learning tools can be very useful for law enforcement personnel. Searching for evidence in electronic devices, e.g., cameras, servers, laptops, tablets and smartphones, is an essential but challenging task for law enforcement agencies because of the importance of the evidence and the huge and increasing storage capacity of the devices. Even in one single case, data seized by law enforcement agencies to be investigated can be several terabytes. It is impossible to check all the data manually. Several face recognition detectors have been employed. However, such face recognition detectors rely heavily on the clarity of facial features. The exemplary embodiments of the present invention address such issues by not exclusively relying on the facial features, but instead employing other peripheral or auxiliary or supplemental features that are related or connected or linked to the person.

Regarding neural networks, neural networks use artificial neurons configured by simplifying functions of biological neurons, and the artificial neurons may be connected to each other through edges having connection weights. The connection weights, parameters of the neural network, are predetermined values of the edges, and may also be referred to as connection strengths. The neural network may perform a cognitive function or a learning process of a human brain through the artificial neurons. The artificial neurons may also be referred to as nodes.

A neural network may include a plurality of layers. For example, the neural network may include an input layer, a hidden layer, and an output layer. The input layer may receive an input to be used to perform training and transmit the input to the hidden layer, and the output layer may generate an output of the neural network based on signals received from nodes of the hidden layer. The hidden layer may be disposed between the input layer and the output layer. The hidden layer may change training data received from the input layer to an easily predictable value. Nodes included in the input layer and the hidden layer may be connected to each other through edges having connection weights, and nodes included in the hidden layer and the output layer may also be connected to each other through edges having connection weights. The input layer, the hidden layer, and the output layer may respectively include a plurality of nodes.

The neural network may include a plurality of hidden layers. A neural network including the plurality of hidden layers may be referred to as a deep neural network. Training the deep neural network may be referred to as deep learning. Nodes included in the hidden layers may be referred to as hidden nodes. The number of hidden layers provided in a deep neural network is not limited to any particular number.

The neural network may be trained through supervised learning. Supervised learning refers to a method of providing input data and output data corresponding thereto to a neural network and updating connection weights of edges so that the output data corresponding to the input data may be output. For example, a model training apparatus may update connection weights of edges among artificial neurons through a delta rule and error back-propagation learning.

Error back-propagation learning refers to a method of estimating a loss with respect to input data provided through forward computation, and updating connection weights to reduce a loss in a process of propagating the estimated loss in a backward direction from an output layer toward a hidden layer and an input layer. Processing of the neural network may be performed in an order of the input layer, the hidden layer, and the output layer. However, in the error back-propagation learning, the connection weights may be updated in an order of the output layer, the hidden layer, and the input layer. Hereinafter, according to an exemplary embodiment, training a neural network refers to training parameters of the neural network. Further, a trained neural network refers to a neural network to which the trained parameters are applied.

Figure 1:
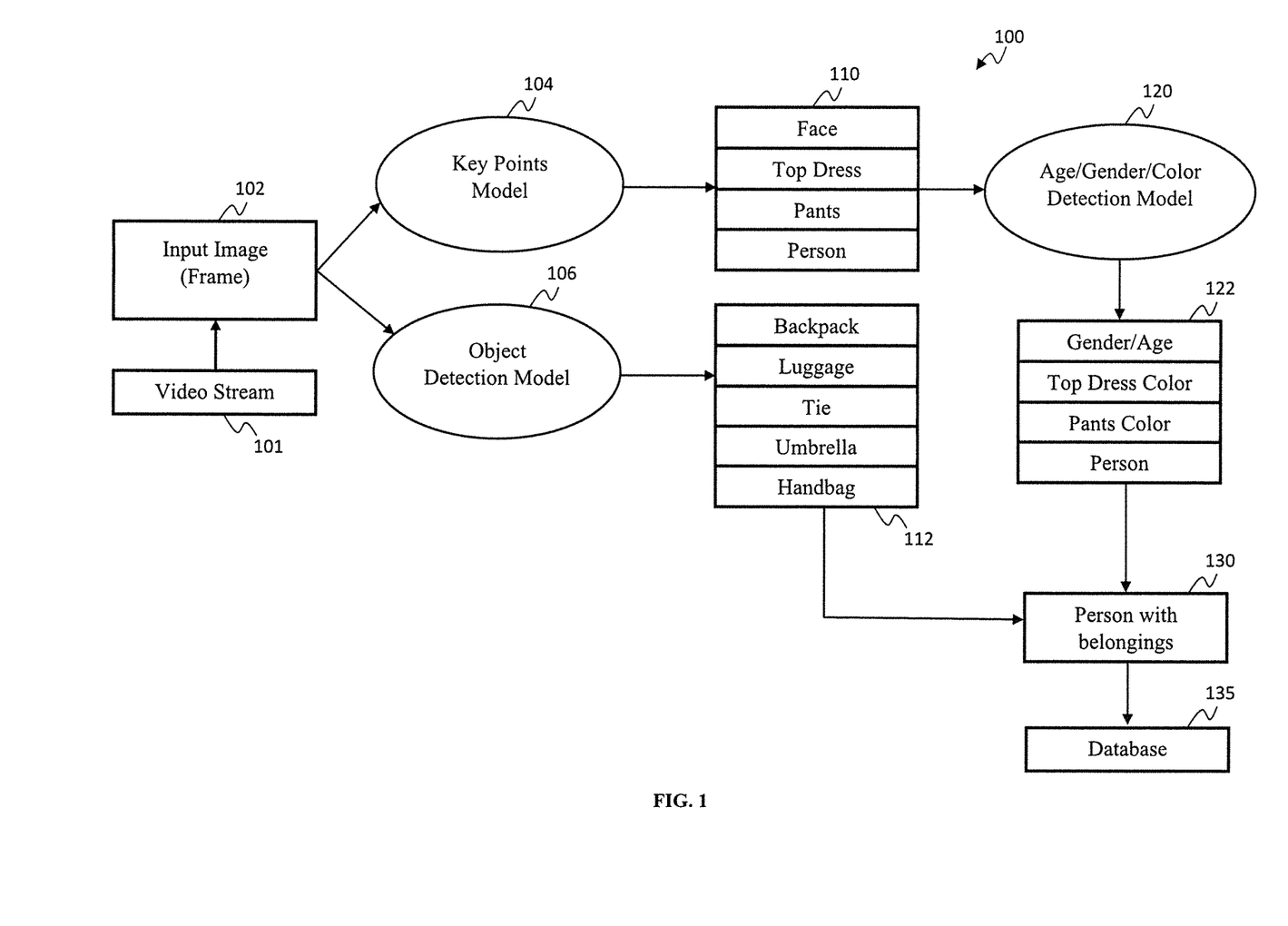
FIG. 1 is a block/flow diagram illustrating the extraction of features from a person detected in a video stream, in accordance with embodiments of the present invention.

FIG. 1 is a block/flow diagram illustrating the extraction of features from a person detected in a video stream, in accordance with embodiments of the present invention.

In system 100, an input frame 102 is extracted from a video stream 101. The input frame 102 is fed into a people key point model 104 and an objection detection model 106.

The people key point model 104 detects key points for each person in the input frame 102. For example, the people key point model 104 can detect features 110, which include, but are not limited to, the location of the face of the person, the location of the clothing of the person (top dress portions), the location of the pants of the person (bottom dress portions), characteristics of the person, etc. The people key point model 104 enables the inference of a face area, a top body area, and a bottom body area.

The objection detection model 106 is applied on the input frame 102 to detect different objects and their location in the input frame 102. The objects 112 can be, e.g., a backpack, luggage, a tie, an umbrella, a handbag, jewelry, etc. Thus, the objects 112 can be any accessory handled by the person. The objection detection model 106 can also pinpoint a location of each of the objects 110 within the input frame 102.

The objects 110 are evaluated by an age/gender/color detector 120. The age/gender/color detector 120 can be applied to the face area of the person to determine age and gender of the individual. The age/gender/color detector 120 can also be applied to the top body area and bottom body area of the person to determine colors of clothing of the person. The detector 120 can include three different models, that is, an age detection model, a gender detection model, and a color detection model. Each model can be a deep learning model. In one example, the deep learning models can be convolutional neural networks (CNNs).

Block 122 provides the outputs of the age/gender/color detector 120. The outputs can be, gender: male, age: between 25-32, top dress color: blue, pants color (or bottom dress color): blue, person face characteristics: facial hair, etc. The outputs 112, 122 are provided to block 130 where a connection or link is made between the objects 112 and the persons in the input frame 102. The connection can be made based on locations of the objects and persons in the input frame 102. Thus, this can be referred to as a spatial or positional connection or link. All the data/information is then saved in a database 135. The database 135 can be referred to as a feature extraction database.

Figure 2:
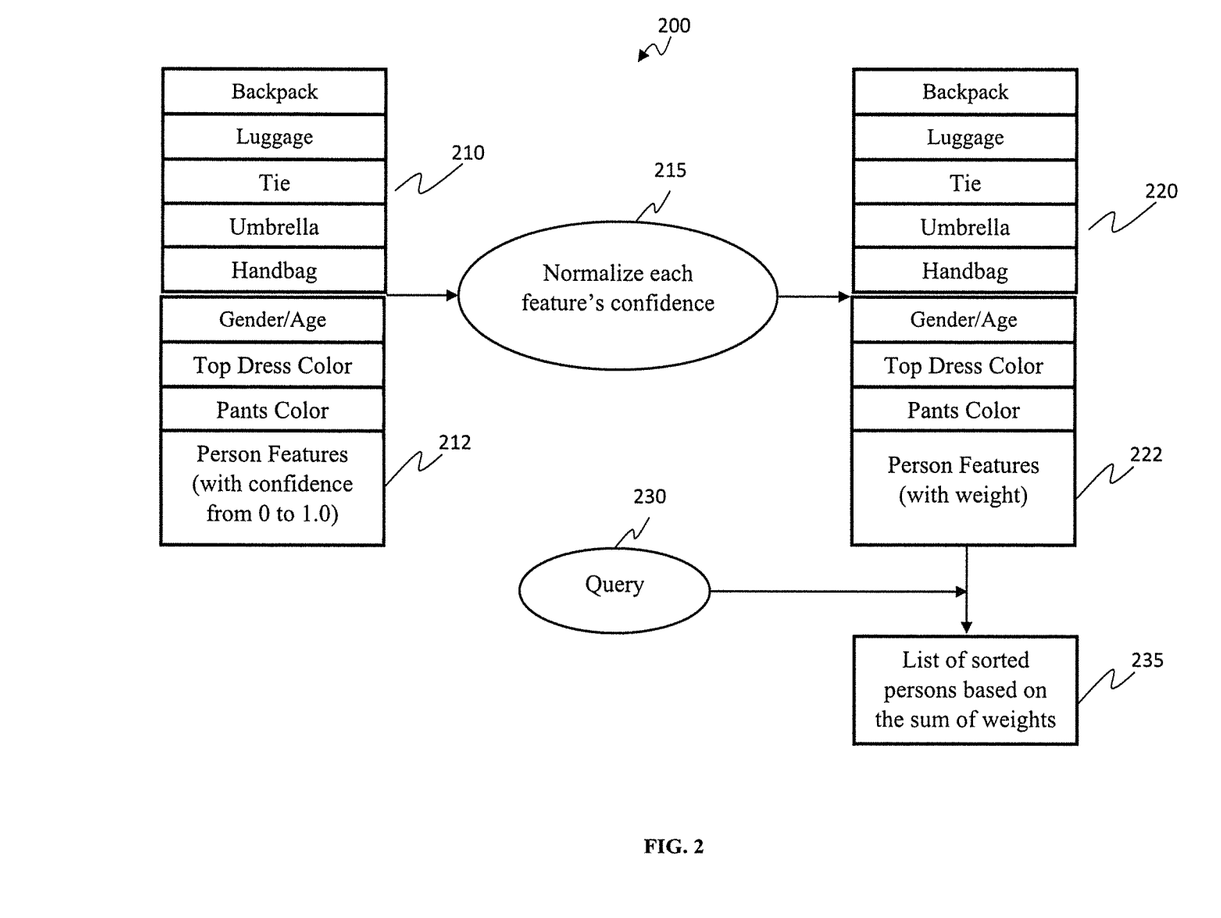
FIG. 2 is a block/flow diagram illustrating ranking search results through normalized weight, in accordance with embodiments of the present invention.

FIG. 2 is a block/flow diagram illustrating ranking search results through normalized weight, in accordance with embodiments of the present invention.

In diagram 200, the objects 110 and the outputs 122 are collectively referred to as features block 210. The features of features block 210 are fed into a normalization unit 215 that normalizes each features' confidence.

In block 215, for each feature of a person, the confidence value is converted to an integer number among 0, 1, 2, or 3. A confidence value of 0.8 can be very positive for people detection, but very weak for gender detection. Therefore, instead of using confidence values, the exemplary embodiments employ weights including, e.g., values 0, 1, 2, and 3. The weight values can be displayed in features block 220.

These four values can equate to: definitely not (0), likely not (1), likely (2), definitely (3). The map between confidence values 212 and weight values 222 is different for each feature. For example, the weight for gender confidence is 0 if the confidence value is less than 0.97, is 1 if the confidence is between 0.97 to 0.98, is 2 if the confidence is between 0.98 to 0.99, and is 3 if the confidence is between 0.99 to 1.

However, for backpack detection, the weight is 0 if confidence is less than 0.3, is 1 if confidence is between 0.3 and 0.5, is 2 if confidence is between 0.5 and 0.7, and is 3 if confidence is between 0.7 and 1.

In block 230, for a search query, the exemplary embodiments first find all matches of the query in the database. Then based on the sum of the weight of each matched feature, the return result is sorted in block 235. This gives top matches in the database 135 to users. Thus, each feature receives a score and a combination of features is used to create an overall score. If the user is searching for, e.g., 3 features, the first feature can receive a score of 3, the second feature can receive a score of 2, and the fourth feature can receive a score of 1. The overall score of a frame having all 3 features if the weighted sum of the 3 features.

Thus, in accordance with FIGS. 1 and 2, the exemplary embodiments of the present invention identify a person or persons in a video stream through one or more features, such as, but not limited to, age, gender, clothing, colors, objects handled by the persons, objects adjacent the persons, etc. A weighted score based on multiple features is provided to a user attempting to make a person match.

Figure 3:
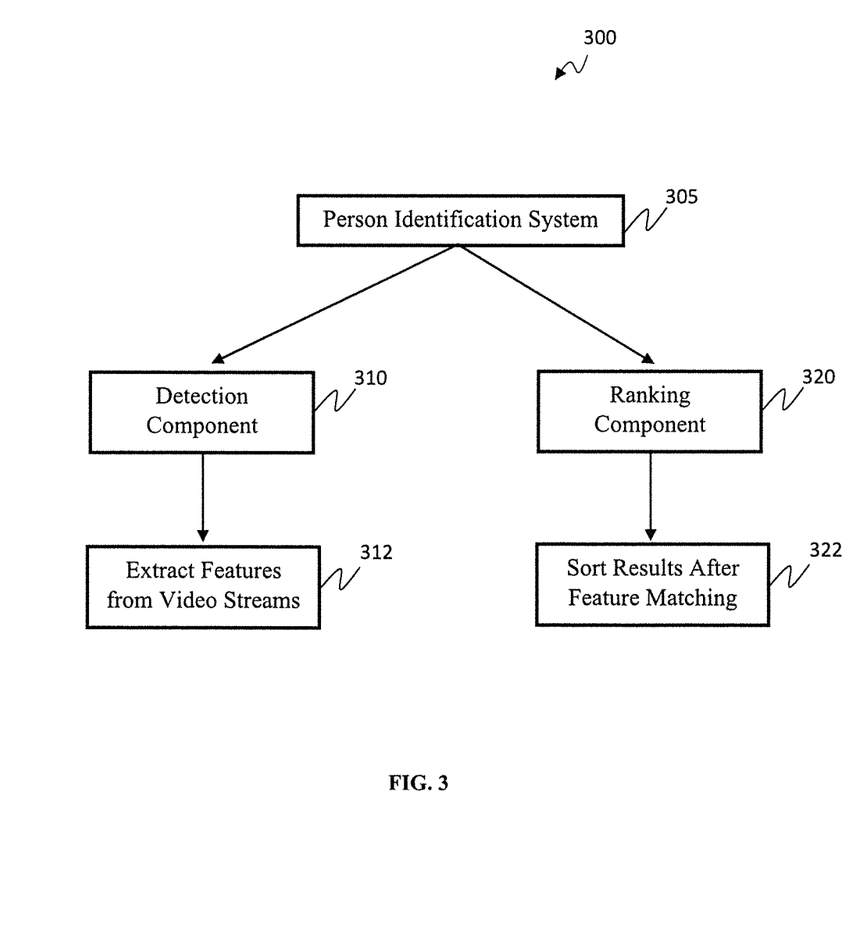
FIG. 3 is a block/flow diagram illustrating the components of the person identification system, in accordance with embodiments of the present invention.

FIG. 3 is a block/flow diagram 300 illustrating the components of the person identification system, in accordance with embodiments of the present invention.

The person identification system 305 thus includes two components. The first component is a detection component 310 and the second component is a ranking component 320. The detection component 310 is employed to extract features 312 from the video streams, whereas the ranking component 320 is employed to sort results 322 after feature matching has been performed.

The detection component 310 includes multiple object detection and recognition models. First, the detection component 310 explores a generic object detection model to detect objects including people, luggage, backpacks, umbrellas, hats, etc. Second, the detection component 310 detects key points of a person to further identify the face, top dress and bottom dress of the person. Third, the detection component 310 applies age and gender models on the face images. Fourth, the detection component 310 applies color detection on the top dress (upper portion of body) and bottom dress (lower portion of body) of the person to detect the colors. Each feature has a confidence value between 0 to 1 to indicate how confident the detection result can be. All these detection features are connected to the person and stored in the database.

The ranking component 320 normalizes each feature match of the search results. Although all features have confidence values between 0 and 1.0, the value space is not linear. Therefore, to normalize the confidence values of different features, the exemplary embodiments only consider four possibilities of the results of detection component as weights: definitely not (0), likely not (1), likely (2), definitely (3). When performing a search, the exemplary embodiments sum up all the weights of all matched features, and sort the results based on the summed weight.

Figure 4:
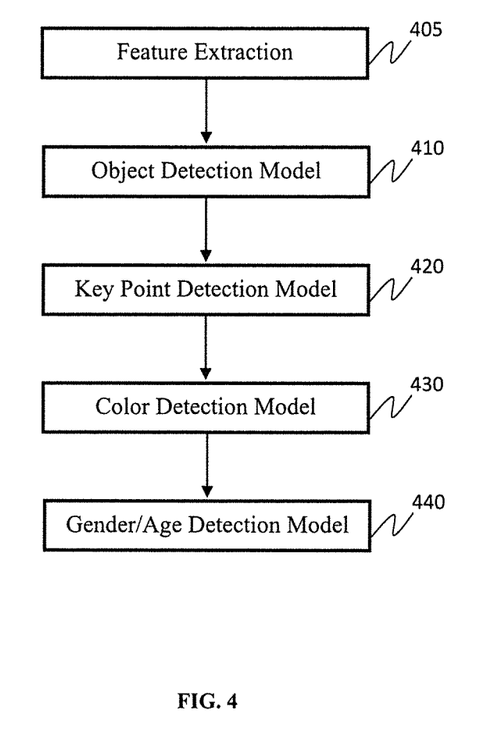
FIG. 4 is a block/flow diagram illustrating the deep learning detection models for feature extraction, in accordance with embodiments of the present invention.

FIG. 4 is a block/flow diagram illustrating the deep learning detection models for feature extraction, in accordance with embodiments of the present invention.

The feature extraction 405 can be accomplished by implementing a plurality of deep learning detection models. In one instance, an object detection model 410, a key point detection model 420, a color detection model 430, and a gender/age detection model 440 are employed. The models 410, 420, 430, 440 are deep learning models. In one example, the deep learning models are CNNs. In another example, the deep learning models are region-based CNN (R-CNN).

Thus, the exemplary embodiments of the present invention employ multiple models to extract features. The object detection model 410 is used to detect varies objects, the key point detection model 420 is used to find the face, top body areas, and bottom body areas. The color detection model 430 is used to detect top clothing color and bottom clothing color. The gender and age detection model 440 is used to detect age and gender from the face of the person. Objects in the frame of the video stream are connected or linked to a person based on locations between the objects and the persons. All these features are stored in one or more databases.

Users can query the database through a set of search conditions. For example, a user can search the database based on the age of the person, the gender of the person, the top clothing color of the person, the bottom clothing color of the person, and/or the objects that belong to the person. Thus, the user has the flexibility to conduct multiple searches based on multiple parameters or variables. One search can entail 3 parameters, another search can entail 4 parameters, another search can entail 5 parameters, etc. A weighted sum will be computed based on the number of input parameters.

The exemplary embodiments of the present invention sort the results of users' queries through normalization. Each detection result's confidence value is normalized into four possible weights: definitely not (0), likely not (1), likely (2), definitely (3). The weights of all matched features will be summed to sort search results. The higher summed weight indicates a more accurate match.

Figure 5:
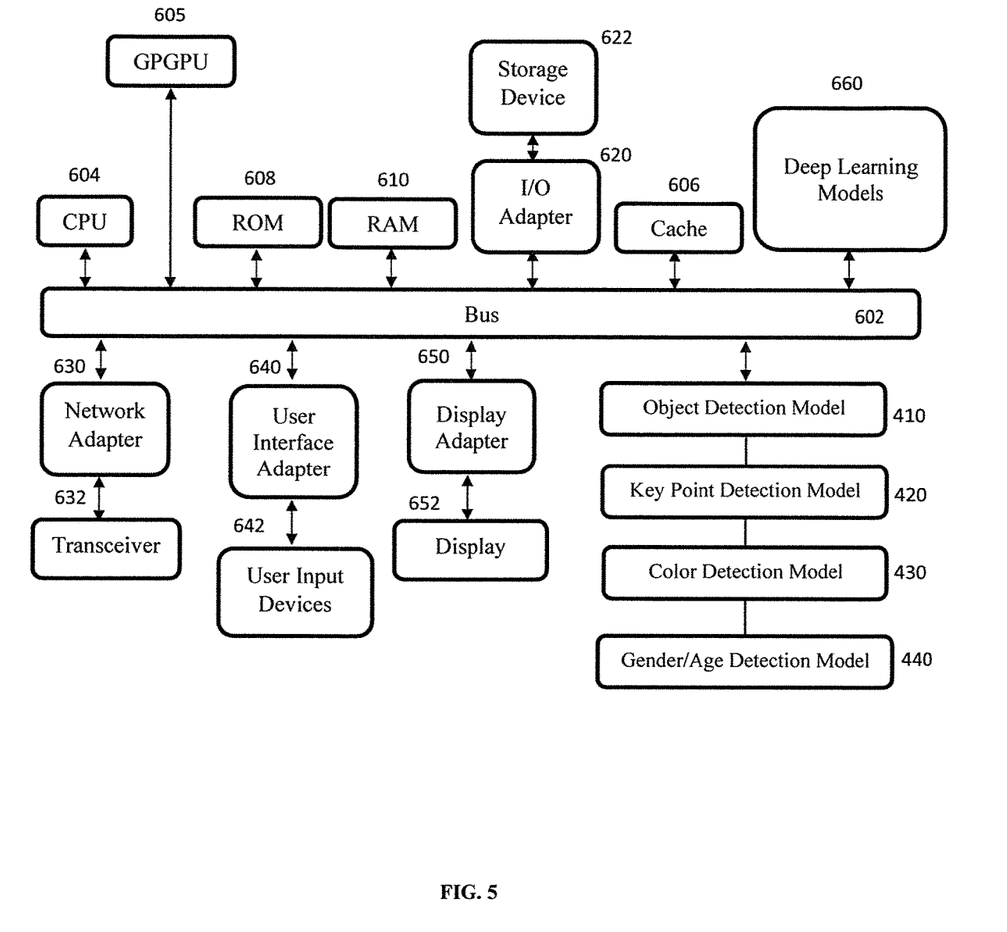
FIG. 5 is an exemplary processing system for employing the deep learning detection models, in accordance with embodiments of the present invention.

FIG. 5 is an exemplary processing system for employing the deep learning detection models, in accordance with embodiments of the present invention.

The processing system includes at least one processor (CPU) 604 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Additionally, deep learning models 660 can be employed. The deep learning models 660 can include an objection detection model 410, a key point detection model 420, a color detection model 430, and a gender/age detection model 440.

A general-purpose graphics processing unit (GPGPU) 605 is also connected to the bus 602. The GPGPU 605 can be employed for accelerating deep learning computations.

A storage device 622 is operatively coupled to system bus 602 by the I/O adapter 620. The storage device 622 can be any of a disk storage device (e.g., a magnetic or optical disk storage device), a solid-state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
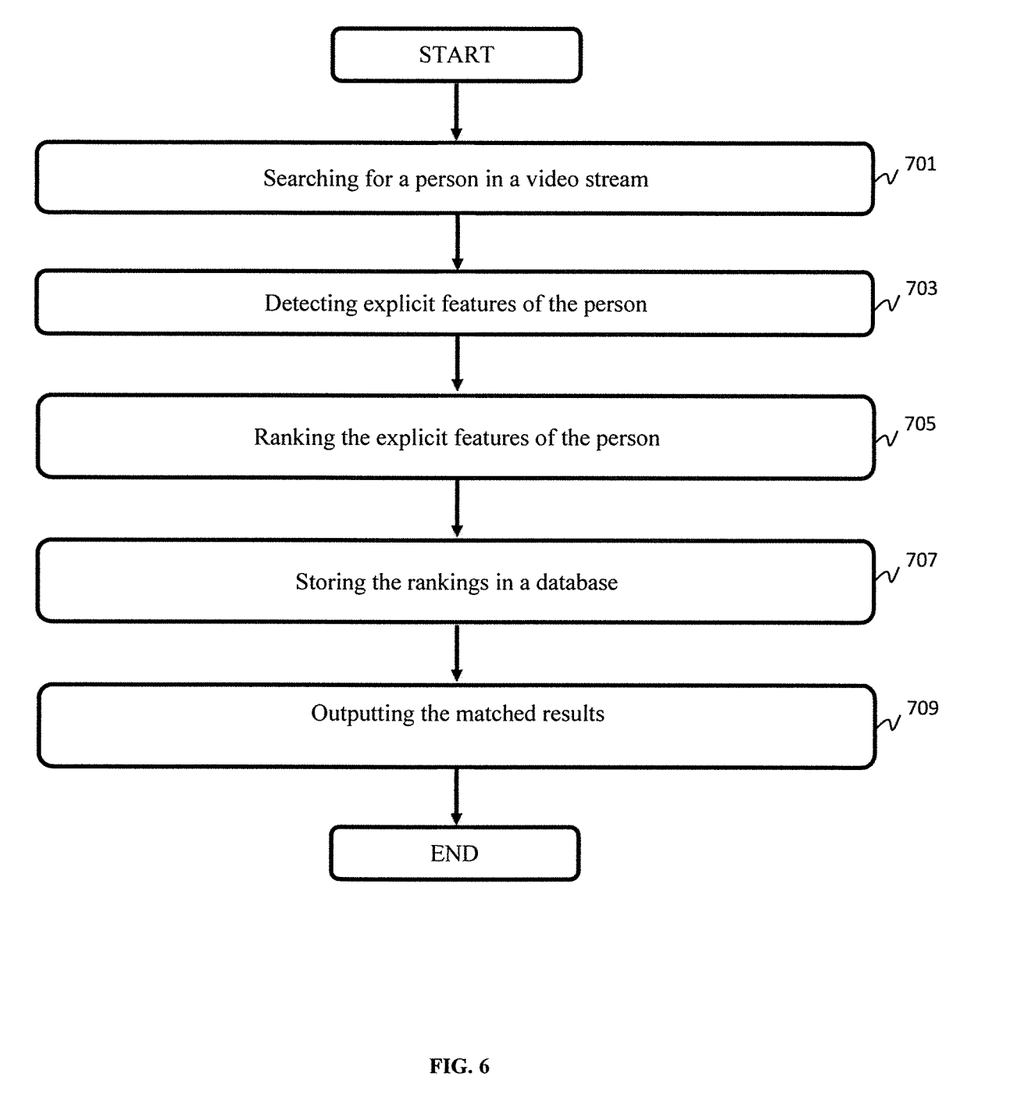
FIG. 6 is a block/flow diagram of a method for identifying a person in a video stream through a plurality of ranked features, in accordance with embodiments of the present invention.

FIG. 6 is a block/flow diagram of a method for identifying a person in a video stream through a plurality of ranked features, in accordance with embodiments of the present invention.

At block 701, a person is searched in a video stream.

At block 703, explicit features of the person are detected.

At block 705, the explicit features of the person are ranked.

At block 707, the rankings are stored in a database.

At block 709, the matched results are outputted.

Figure 7:
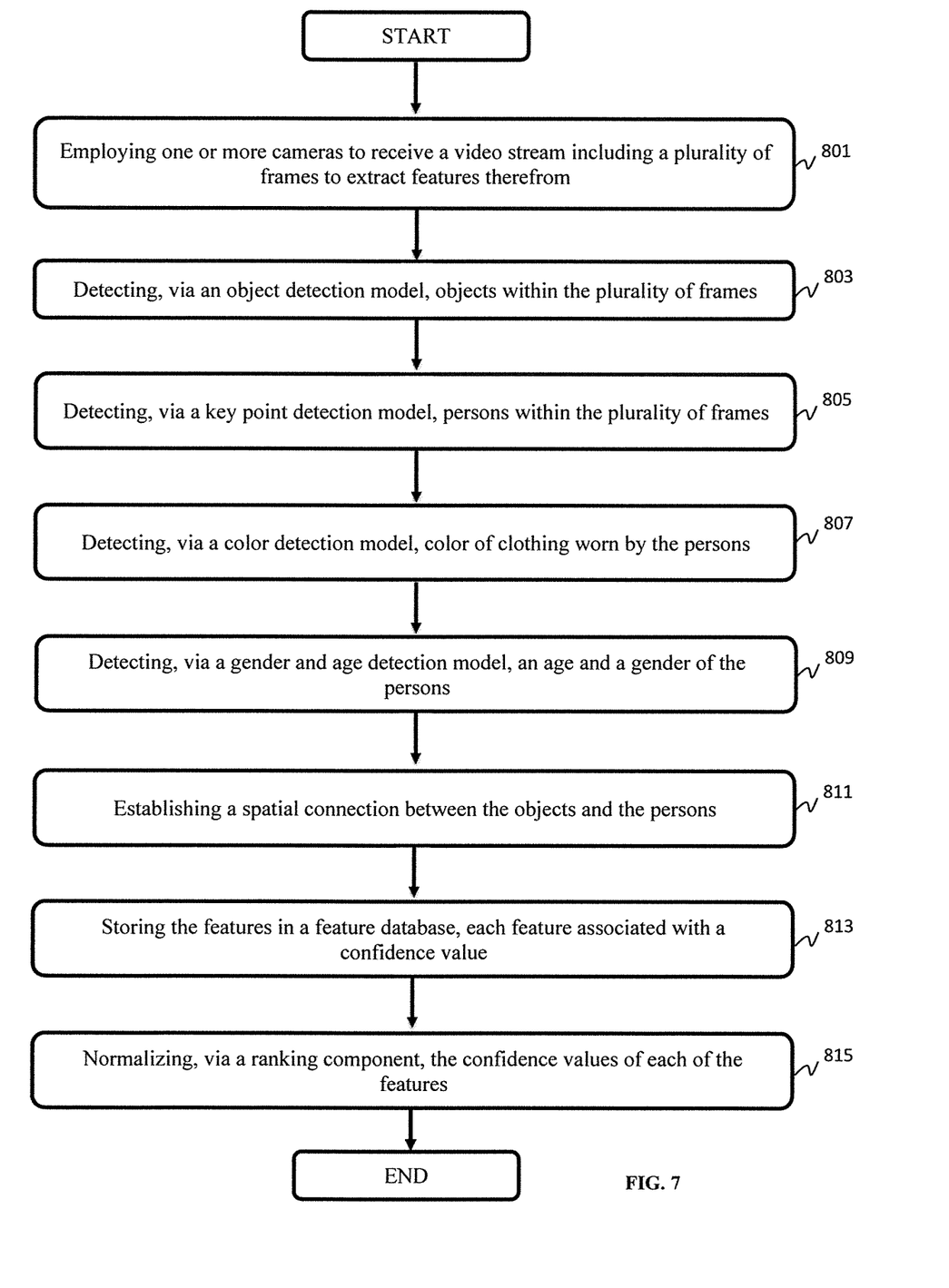
FIG. 7 is a block/flow diagram of a method for identifying a person in a video stream by employing deep learning for object detection and classification (and no deep learning for matching), in accordance with embodiments of the present invention.

FIG. 7 is a block/flow diagram of a method for identifying a person in a video stream by employing deep learning for object detection and classification (and no deep learning for matching), in accordance with embodiments of the present invention.

At block 801, employ one or more cameras to receive a video stream including a plurality of frames to extract features therefrom.

At block 803, detect, via an object detection model, objects within the plurality of frames. The object detection model is a deep learning model.

At block 805, detect, via a key point detection model, persons within the plurality of frames. The key point detection model is a deep learning model.

At block 807, detect, via a color detection model, color of clothing worn by the persons. The color detection model is a deep learning model.

At block 809, detect, via a gender and age detection model, an age and a gender of the persons. The gender and age detection model is a deep learning model. Thus, 4 different deep learning models or engines are employed to extract features. The actual person matching does not employ a deep learning model. Instead, the person matching occurs manually by a user.

At block 811, establish a spatial connection between the objects and the persons.

At block 813, store the features in a feature database, each feature associated with a confidence value. The confidence value of each feature is between 0 and 1.

At block 815, normalize, via a ranking component, the confidence values of each of the features.

Figure 8:
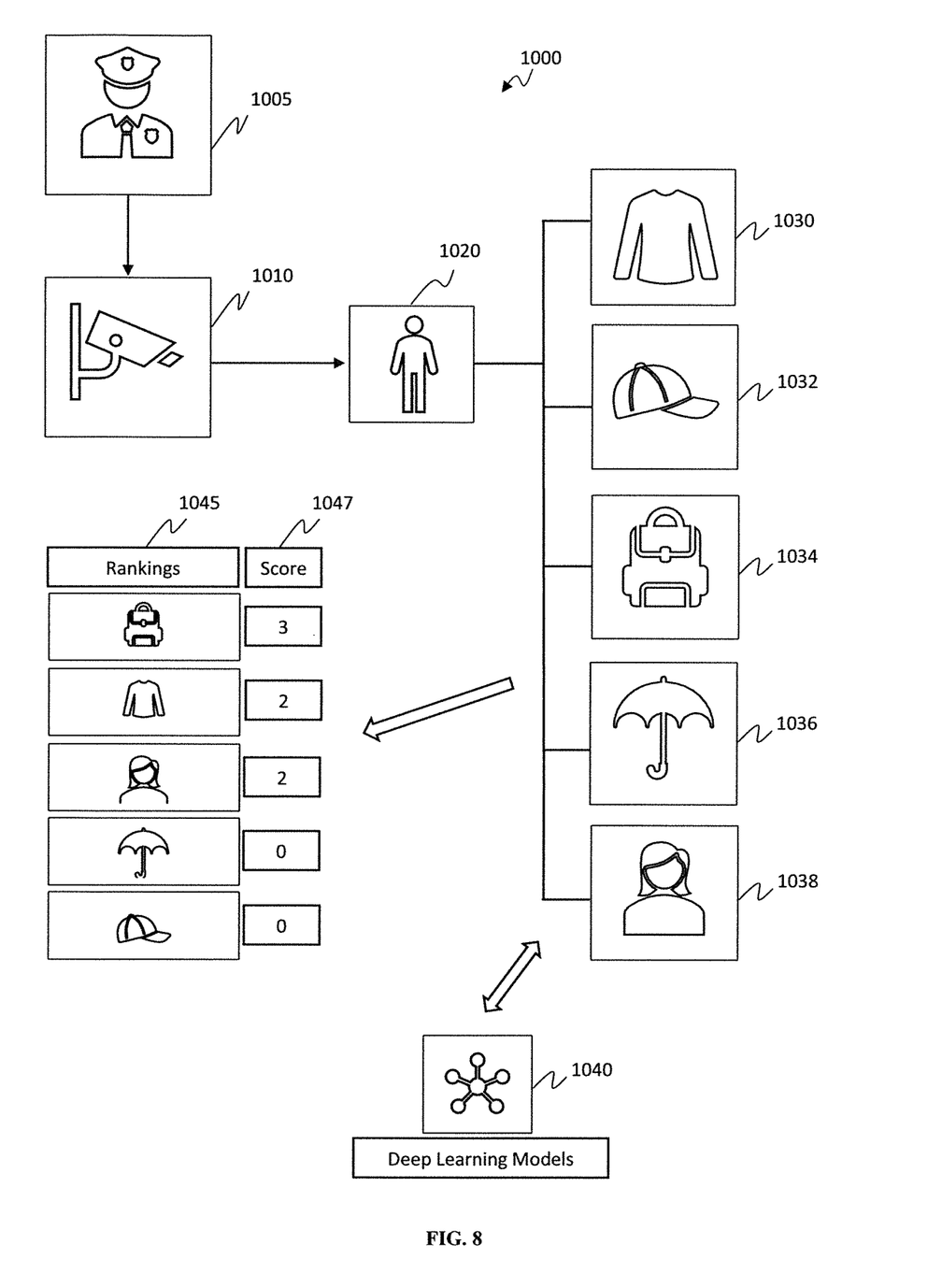
FIG. 8 is a block/flow diagram of practical applications for identifying a person in a video stream by employing deep learning for object detection and classification, in accordance with embodiments of the present invention.

FIG. 8 is a block/flow diagram of practical applications for identifying a person in a video stream by employing deep learning for object detection and classification, in accordance with embodiments of the present invention.

In one example, law enforcement 1005, e.g., a police officer, may want to browse through the database to find a missing teenage girl that is wearing red pants and is carrying a backpack. The missing teenage girl was last seen at a local mall.

Cameras 1010, located within the mall, take video of a person 1020 walking through the mall at a certain time. The video streams obtained by the cameras 1010 can be analyzed to find features therein. The deep learning models 1040 can be used to search for a young girl (age and gender) wearing red pants (color red, bottom clothing) and having a backpack (object). The deep learning models 1040 identify the frames in the video streams that include red shirts 1030, hats 1032, backpacks 1034, umbrellas 1036, and young women 1038. The features 1030, 1032, 1034, 1036, 1038 are then ranked 1045 and scored 1047. In the instant case, images with backpacks were ranked "3" (definitely), images with red shirts were ranked "2" (likely), images with young women were ranked "2" (likely), images with umbrellas were ranked "0" (definitely not), and images with hats were ranked "0" (definitely not).

Thus, when law enforcement 1005 makes a query, e.g., a voice query or a text-based query, the system 1000 returns images where there is young women with a red shirt and a backpack. These are the images that resulted in the highest scores. Images that included a young woman and an umbrella were discarded or ranked low. Images that included a young woman and a hat were discarded or ranked low. Images that included a young woman and a red shirt only ranked in the middle. Images that included all 3 elements, e.g., young woman, red shirt, and backpack rated very high. The law enforcement 1005 was provided with the highest ranked images for evaluation. The matching occurs manually by the, e.g., law enforcement 1005. In other words, the matching does not involve a deep learning model. Only the objects and features of the person in the frames of the video stream are determined by deep learning models.

Moreover, the search can be conducted by voice activation (voice recognition input) or text-based activation. A voice command interface device can be configured to receive speech input from a user and convert the speech input into electrical audio signals. In one example, a microphone, such as an external microphone, internal microphone, wireless microphone, and the like, is used to receive and convert the speed input.

Text-based searching of image data can be accomplished by any type of hardware devices, as shown in FIG. 5.

Of course, one skilled in the art can contemplate a plurality of other different practical applications for using the feature database.

In summary, the exemplary embodiments of the present invention disclose a system for searching for people in video streams through multiple features. One example of a practical application of the exemplary system is to help law enforcement find a missing teenage girl with red pants and a backpack through surveillance videos. The exemplary system has two components, a detection component that extracts features from videos, and a ranking component that sorts results after features matching. It is noted that deep learning models are applied only to object detection and classification, not to people matching. People matching occurs manually by one or more users, such as law enforcement personnel. As a result, the exemplary embodiments of the present invention do not need high quality facial images since other peripheral or auxiliary features, other than facial features, can be employed to find a match. The user search can be voice-activated or text-activated. Additionally, the exemplary embodiments normalize the confidence values from deep learning engines with the benefit of high accuracy of deep learning engines.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed by at least one processor for person identification, the method comprising:
- employing one or more cameras to receive a video stream including a plurality of frames to extract features therefrom;
- detecting, via an object detection model, objects within the plurality of frames;
- detecting, via a key point detection model, persons within the plurality of frames;
- detecting, via a color detection model, color of clothing worn by the persons;
- detecting, via a gender and age detection model, an age and a gender of the persons;
- establishing a spatial connection between the objects and the persons;
- storing the features in a feature database, each feature associated with a confidence value; and
- normalizing, via a ranking component, the confidence values of each of the features,
- wherein the features are sorted based on a summed weight.

2. The method of claim 1, wherein the key point detection model identifies features related to a face region, a top body region, and a bottom body region of the individuals.

3. The method of claim 2, wherein the gender and age detection model is applied to the face region of the individuals.

4. The method of claim 1, wherein the object detection model, the key point detection model, the color detection model, and the gender and age detection model are deep learning models.

5. The method of claim 1, wherein the confidence value is between 0 and 1.

6. The method of claim 1, wherein a user searches the feature database to manually conduct a person match.

7. The method of claim 6, wherein the user conducts either a voice-based search or a text-based search for the person match.

8. A system for person identification, the system comprising:
- a memory; and
- a processor in communication with the memory, wherein the processor runs program code to:
  - employ one or more cameras to receive a video stream including a plurality of frames to extract features therefrom;
  - detect, via an object detection model, objects within the plurality of frames;
  - detect, via a key point detection model, persons within the plurality of frames;
  - detect, via a color detection model, color of clothing worn by the persons;
  - detect, via a gender and age detection model, an age and a gender of the persons;
  - establish a spatial connection between the objects and the persons;
  - store the features in a feature database, each feature associated with a confidence value; and
  - normalize, via a ranking component, the confidence values of each of the features,
  - wherein the features are sorted based on a summed weight.

9. The system of claim 8, wherein the key point detection model identifies features related to a face region, a top body region, and a bottom body region of the individuals.

10. The system of claim 9, wherein the gender and age detection model is applied to the face region of the individuals.

11. The system of claim 8, wherein the object detection model, the key point detection model, the color detection model, and the gender and age detection model are deep learning models.

12. The system of claim 8, wherein the confidence value is between 0 and 1.

13. The system of claim 8, wherein a user searches the feature database to manually conduct a person match.

14. The system of claim 13, wherein the user conducts either a voice-based search or a text-based search for the person match.

15. A non-transitory computer-readable storage medium comprising a computer-readable program for person identification, wherein the computer-readable program when executed on a computer causes the computer to perform the steps of:
- employing one or more cameras to receive a video stream including a plurality of frames to extract features therefrom;
- detecting, via an object detection model, objects within the plurality of frames;
- detecting, via a key point detection model, persons within the plurality of frames;
- detecting, via a color detection model, color of clothing worn by the persons;
- detecting, via a gender and age detection model, an age and a gender of the persons;
- establishing a spatial connection between the objects and the persons;
- storing the features in a feature database, each feature associated with a confidence value; and
- normalizing, via a ranking component, the confidence values of each of the features,
- wherein the features are sorted based on a summed weight.

16. The non-transitory computer-readable storage medium of claim 15, wherein the object detection model, the key point detection model, the color detection model, and the gender and age detection model are deep learning models.

17. The non-transitory computer-readable storage medium of claim 15, wherein a user searches the feature database to manually conduct a person match.

* * * * *